United States Patent [19]
Fukuhara et al.

[11] 4,322,616
[45] Mar. 30, 1982

[54] FOCUS DETECTING DEVICE WITH SHIELDING

[75] Inventors: Toru Fukuhara, Isehara; Ken Utagawa, Yokohama, both of Japan

[73] Assignee: Nippon Kogaku K.K., Tokyo, Japan

[21] Appl. No.: 131,494

[22] Filed: Mar. 18, 1980

[30] Foreign Application Priority Data

Mar. 22, 1979 [JP] Japan .................................. 54/33586
Apr. 11, 1979 [JP] Japan ........................... 54/46925[U]

[51] Int. Cl.³ .............................................. G01J 1/36
[52] U.S. Cl. ...................................... 250/204; 354/25
[58] Field of Search ........... 250/201, 204, 209, 237 R, 250/216; 354/25; 356/141, 152, 1, 4, 5

[56] References Cited

U.S. PATENT DOCUMENTS

4,117,325 9/1978 Holle et al. ......................... 250/204
4,258,989 3/1981 Tokutomi et al. ..................... 354/25

Primary Examiner—David C. Nelms
Attorney, Agent, or Firm—Fitzpatrick, Cella, Harper & Scinto

[57] ABSTRACT

In a focus detecting device wherein, from an object light passed through an image forming optical system, a first image and a second image are formed by a pair of re-imaging optical systems and the in-focus condition of the image forming optical system with respect to an object is detected from the variations in position of the first and second images with respect to a pair of photoelectric converters disposed on or near the focal planes of the pair of re-imaging optical systems, there is provided shield means for shielding, substantially symmetrically with respect to the optic axis of the image forming optical system, part of light beams forming the first and second images formed on the pair of photoelectric converters by the image forming optical system and the pair of re-imaging optical systems.

10 Claims, 4 Drawing Figures

FOCUS DETECTING DEVICE WITH SHIELDING

BACKGROUND OF THE INVENTION

1 Field of the Invention

This invention relates to a focus detecting device.

2 Description of the Prior Art

A focus detecting device for a single lens reflex camera in which, from a light passed through the focus plate of the single lens reflex camera, a first image and a second image are formed by a pair of re-imaging lenses and the infocus condition of an objective lens is detected from the variations in position of said first and second images with respect to a pair of image position detecting photoelectric converters disposed on or near the focal planes of said pair of re-imaging lenses is already known, for example, from Japanese Laid-open patent application No. 7323/1979.

However, the prior art has the following disadvantages which will hereinafter be described by reference to the accompanying drawings. FIG. 1 is an illustration of the focus detecting device according to the prior art. In FIG. 1, the light beam passed through a phototaking objective lens 1 is converged on the focal plane 2 of a focus plate and then diverged, and part of the light beam passed through the objective lens is converged and imaged on the light-receiving surfaces of a pair of photoelectric elements 4 and 4' by a pair of re-imaging lenses 3 and 3' disposed symmetrically with respect to the optic axis of the objective lens 1. The pair of photoelectric elements 4 and 4' act as image position detecting photoelectric converters and specifically comprise a photoelectric element array. It should be noted here that the distributions of the intensities of illumination on the light-receiving surfaces of the photoelectric elements 4 and 4' for an object must be equal to each other. This is because the focus detection is accomplished by comparing the photoelectric outputs for the same region of an image (light image).

Now, when light beams impinging on the upper light-receiving surface $4a$, the central light-receiving surface $4c$ and the lower light-receiving surface $4b$ of the photoelectric element 4 are conversely projected upon the exit pupil of the objective lens 1 from these light-receiving surfaces through the re-imaging lens 3, they become such as shown in FIG. 1. That is, a light beam forming an opening $a_1 a_2 a_3$ impinges on the upper light-receiving surface $4a$, and a light beam forming an opening $c_1 c_2 c_3$ impinges on the central light-receiving surface $4c$. These openings $a_1 a_2 a_3$ and $c_1 c_2 c_3$ are determined by the effective F-number of the re-imaging lens 3 and are substantially equal in size. However, when converse projection is effected upon the lower light-receiving surface $4b$ in the same manner as upon the former two light-receiving surfaces, the light beam which should impinge on the light-receiving surface $4b$ through the re-imaging lens 3 has an opening $b_1 b_2 b_3$, but when the pupil diameter of the objective lens is small, part of the light beam is missed at the upper end of the objective lens 1 and only a light beam forming an opening $b'_1 b_2 b_3$ can impinge on the lower light-receiving surface $4b$. This means that, for example, when an object having a uniform distribution of brightness is measured, the intensity of illumination on the lower light-receiving surface $4b$ is reduced as compared with the intensities of illumination on the upper light-receiving surface $4a$ and the central light-receiving surface $4c$. That is, a distribution of intensity of illumination corresponding to the brightness distribution of the object cannot be obtained on the light-receiving surface of the photoelectric element 4.

This phenomenon equally occurs to the other photoelectric element 4' and the intensity of illumination on the upper light-receiving surface $4'a$ on which the light beam missed at the lower end of the objective lens 1 impinges is reduced below the intensities of illumination on the central light-receiving surface $4'c$ and the lower light-receiving surface $4'b$. Now, the light image formed on the light-receiving surface $4b$ and the light image formed on the light-receiving surface $4'a$ are identical, but the reproducibility of the intensity of illumination of the light image for the object differs from region to region and therefore, the distributions of brightness of the images on the photoelectric elements 4 and 4' do not become identical. Accordingly, the photoelectric outputs of the photoelectric elements 4 and 4' cannot be properly compared and thus, there occurs a focus detection error.

SUMMARY OF THE INVENTION

It is a first object of the present invention to provide a focus detecting device in which the adverse effect of the vignetting resulting from the size of the pupil diameter of the objective lens is eliminated and which is capable of accurate focus detection.

It is a second object of the present invention to provide a focus detecting device for a single lens reflex camera in which, when a plurality of interchangeable objective lenses are used with the camera, the adverse effect of the vignetting resulting from the size of the exit pupils of the objective lenses is eliminated and which is capable of accurate focus detection.

The construction of the present invention for achieving these objects is provided with shield means for shielding, substantially symmetrically with respect to the optic axis of an objective lens, part of image forming light beams provided by the objective lens and a pair of re-imaging optical systems for forming a first image and a second image on a pair of photoelectric converters, respectively, from an object light passed through the objective lens.

The invention will become more fully apparent from the following detailed description of an embodiment thereof taken in conjunction with the accompanying drawings.

DESCRIPTION OF THE PREFERRED EMBODIMENTS

Figure 1:
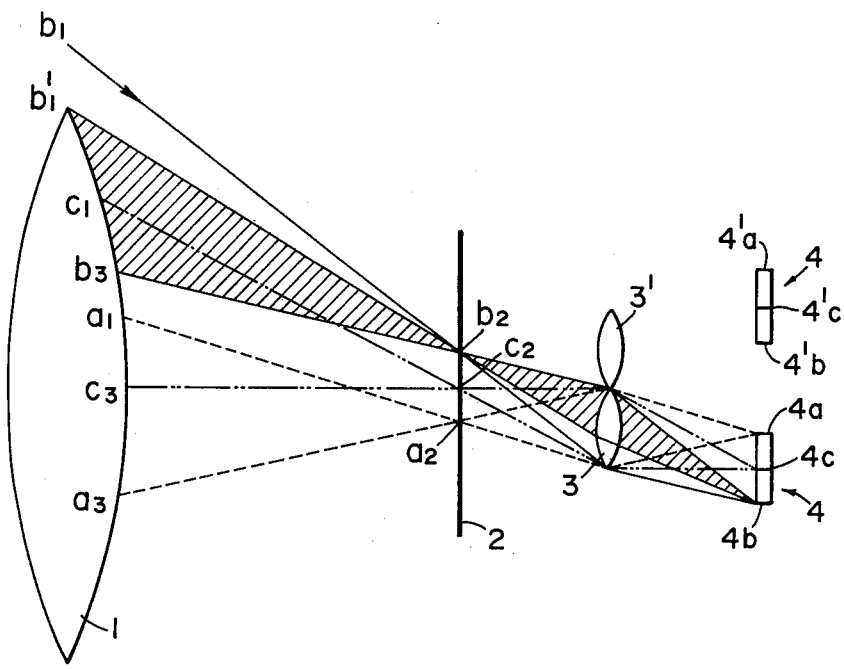
FIG. 1 illustrates the focus detecting device according to the prior art.
Figure 2:
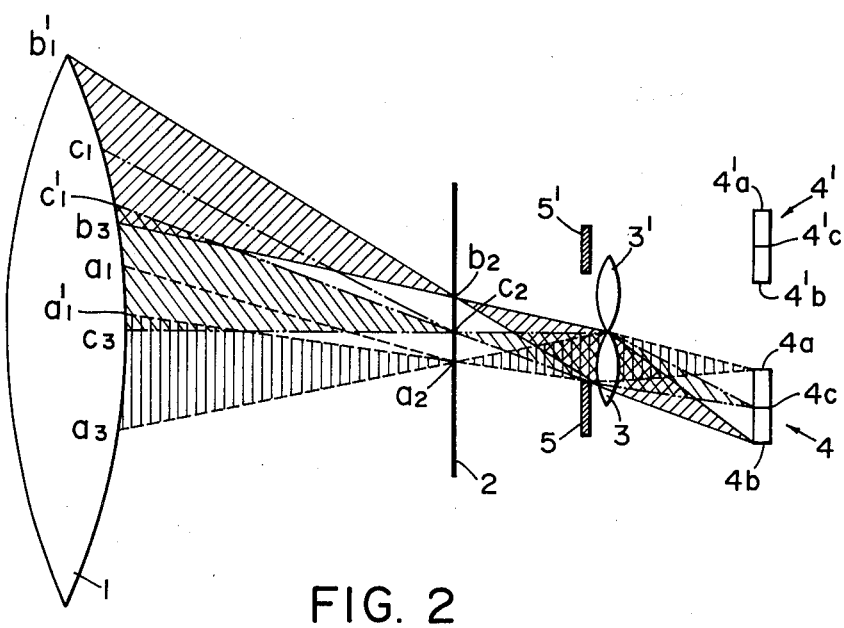
FIG. 2 illustrates the focus detecting device according to the present invention.

In FIG. 2, shield plates 5 and 5' are inserted from the outer periphery side of re-imaging lenses 3 and 3' toward the optic axis of an objective lens 1. Thereupon, a light beam impinging on the light-receiving surface $4b$ of a photoelectric element 4 remains to assume an opening $b'_1 b_2 b_3$ and is not varied, whereas part of light beams passing to light-receiving surfaces $4a$ and $4c$ is shielded by the shield plate 5 and these light beams assume openings a'₁ a₂ a₃ and c'₁ c₂ c₃, respectively, and their opening angles are decreased. Likewise, light beams impinging on the light-receiving surfaces 4'b and 4'c of a photoelectric element 4' are also shielded.

Accordingly, if the amounts of projection of the shield plates 5 and 5' into the light-receiving optical path are determined so that, of the light beams passed through the objective lens and impinging on the light-receiving surfaces 4a, 4c and 4'b, 4'c, the light beam shielded by the shield plates 5 and 5' is substantially coincident with the light beam missing the objective lens 1, the intensities of illumination on the light-receiving surfaces of the photoelectric elements 4 and 4' will become uniform. Since the re-imaging lenses 3 and 3' are disposed symmetrically with respect to the optic axis of the objective lens, the shield plates 5 and 5' must substantially symmetrically shield the light beams passed through the objective lens and passing to the light-receiving surfaces 4a, 4c and 4'b, 4'c.

Figure 3:
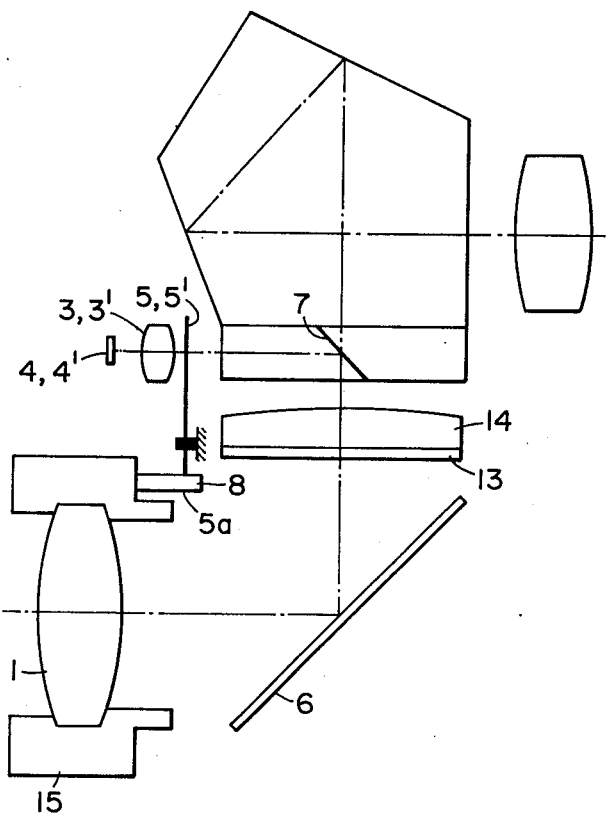
FIG. 3 shows the correcting device of the focus detecting device according to the present invention.
Figure 4:
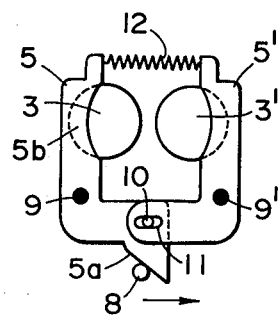
FIG. 4 shows the shield mechanism in FIG. 3.

FIGS. 3 and 4 show specific arrangements of a focus detecting optical system and a correcting device. The light rays having emerged from the objective lens 1 are reflected by a principal mirror 6 and pass through a focus plate 13 and a condenser lens 14 and are further reflected by a half-mirror 7 and pass through the re-imaging lenses 3 and 3' to the photoelectric elements 4 and 4'. In this construction, the shielding as previously described is effected by the following method. A correction signal pin 8 is studded on the barrel 15 of the objective lens 1 and, when the objective lens 1 is mounted to a camera body (not shown), the end face 5a of the shield plate 5 is forced in the direction of arrow in FIG. 4.

In FIG. 4, the shield plates 5 and 5' are biased by a return spring 12 so that they come close to each other (so that the shield plate 5 is rotated clockwisely about a pivot 9 and the shield plate 5' is rotated counter-clockwisely about a pivot 9'). Therefore, before an interchangeable lens is mounted, the shield plates 5 and 5' are in a condition in which they have considerably advanced into the optical paths of the re-imaging lenses 3 and 3'.

Now, by the above-described forcing against the end surface 5a, the shield portion 5b retracts from the optical path of the re-imaging lens 3 by a predetermined amount and the amount of advance into the optical path is determined, and the expected shielding operation is effected. A pin 10 is studded on the shield plate 5 and fits in a groove 11 provided in the shield plate 5'. Accordingly, the shield plate 5' is also retracted from the optical path of the re-imaging lens 3' by a predetermined amount as the result of the position of the pin 10 being displaced in response to the rotation of the shield plate 5, thereby shielding the optical path with an expected amount of advance. The correction signal pin 8 may have its position determined in accordance with the optical characteristic, for example, the open F-value, of the objective lens 1. The shapes of the shield end portion 5a and groove 11 may of course be determined in accordance with the position of the correction signal pin 8 and the shape of the shield end portion 5b or the required amount of shielding.

According to the present invention, as has been described above, when the objective lens has been interchanged, the correction of the focus detecting device can be accomplished in response to the mounting of the objective lens onto the camera body. That is, the intensities of illumination on the light-receiving surfaces of a pair of photoelectric elements can be rendered substantially equal and thus, accurate focus detection can be accomplished.

Minimizing the amounts of projection of the shield plates 5 and 5' in accordance with the pupil diameter of each phototaking objective lens is more effective to take out the photoelectric output.

Further, the shield plates 5 and 5' may be shaped and projected along the curved surfaces of the entrance surfaces or the exit surfaces of the re-imaging lenses 3 and 3'. Also, the shield plates may be installed on at least one curved surface side of the entrance surface or the exit surface of each of the re-imaging lenses 3 and 3'. Further, the shield plates 5 and 5' may be replaced by electro-optical elements having a light-intercepting property such as liquid crystal elements or electrochromic elements to obtain the same effect.

Furthermore, the method of shielding the re-imaging lenses is not restricted to shielding them from the outside thereof with respect to the optic axis of the objective lens as described above, but as the means for overcoming the disadvantage in aberrations resulting from the use only of one side of each of the re-imaging lenses, it is effective to shield even the portion of the re-imaging lenses which is near the optic axis of the objective lens, symmetrically with respect to the optic axis of the re-imaging lenses, in addition to shielding the re-imaging lenses from the outside thereof. At this time, the intensities of illumination on the photoelectric elements are only uniformly reduced over the entire light-receiving surfaces and this raises no particular problem in the focus detection.

Also, when the re-imaging lenses and the photoelectric elements are disposed ahead of the focus plate, namely, forwardly of the camera body, as shown in FIG. 3, then the spacing between the correction signal member of the objective lens and the shield means can be reduced and an intermediate mechanism becomes unnecessary and therefore, not only the shielding operation becomes reliable but also it is advantageous for making the entire device compact.

We claim:

1. A focus detecting device in which, from an object light passed through an image forming optical system, a first image and a second image are formed by a pair of re-imaging optical systems and the in-focus condition of said image forming optical system with respect to an object is detected from the variations in position of said first image and said second image with respect to a pair of photoelectric converters disposed on or near the focal planes of said pair of re-imaging optical systems, the improvement comprising:

shield means (5, 5') provided for shielding, substantially symmetrically with respect to the optic axis of said image forming optical system, part of light beams forming said first and second images formed on said pair of photoelectric converters by said image forming optical system and said pair of re-imaging optical systems.

2. The focus detecting device according to claim 1, wherein said shield means is provided so as to shield part of said light beams from the outside of each of the light beams forming said first and second images with respect to the optic axis of said image forming optical system.

3. The focus detecting device according to claim 1, wherein said shield means is provided near at least one of the entrance surface and the exit surface of each of said re-imaging optical systems.

4. The focus detecting device according to claim 3, wherein said shield means includes shield plates provided in the optical paths of the light beams forming said first and second images.

5. The focus detecting device according to claim 3, wherein said shield means includes electro-optical elements provided in the optical paths of the light beams forming said first and second images.

6. A focus detecting device for a single lens reflex camera having a removable phototaking lens in which, from an object light passed through a focus plate provided on the image formation plane of the phototaking lens, a first image and a second image are formed by a pair of re-imaging optical systems and the in-focus condition of said phototaking lens with respect to an object is detected from the variations in position of said first image and said second image with respect to a pair of photoelectric converters disposed on or near the focal planes of said pair of re-imaging optical systems, the improvement comprising:

shield means (5, 5') provided for shielding, substantially symmetrically with respect to the optic axis of said phototaking lens, part of light beams forming said first and second images formed on said pair of photoelectric converters by said phototaking lens and said pair of re-imaging optical systems; and means (8, 5a) for driving said shield means in response to the mounting of said phototaking lens onto the camera.

7. The focus detecting device according to claim 6, wherein said driving means includes signal means (8) provided on said phototaking lens for transmitting the mounting of said phototaking lens onto the camera to said shield means.

8. The focus detecting device according to claim 7, wherein said shield means includes a shield plate capable of entering into the optical paths of the light beams forming said first and second images, and said signal means includes a signal member capable of driving said shield plate during said mounting.

9. The focus detecting device according to claim 7, wherein said signal means includes a signal representing the open F-value of said phototaking lens.

10. The focus detecting device according to claim 6, wherein said pair of re-imaging optical systems and said shield means are provided spatially on the object side with respect to said focus plate, and said shield means is provided near at least one of the entrance surface and the exit surface of said re-imaging optical systems.

* * * * *